Sept. 17, 1940.  E. C. HORTON  2,215,371
WIPER ARM
Filed Sept. 29, 1936
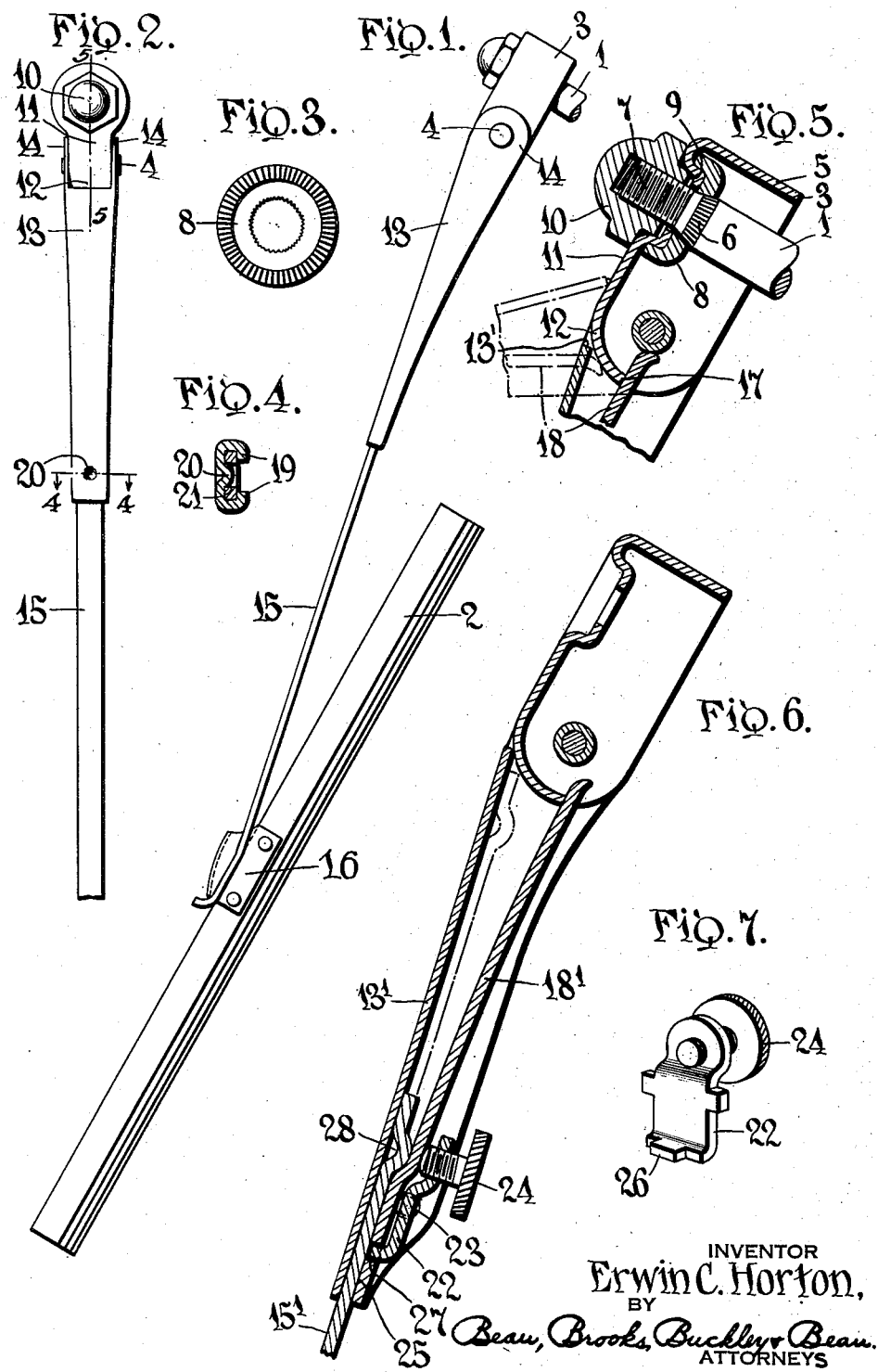
INVENTOR
Erwin C. Horton,
BY
Beau, Brooks, Buckley & Beau.
ATTORNEYS

UNITED STATES PATENT OFFICE 2,215,371

WIPER ARM

Erwin C. Horton, Hamburg, N. Y., assignor to Trico Products Corporation, Buffalo, N. Y.

Application September 29, 1936, Serial No. 103,141

8 Claims. (Cl. 15—255)

This invention relates to a windshield cleaner and more particularly to the wiper arm thereof.

Wiper arms have heretofore been designed with a hinge construction by which the outer end of the arm with its supported wiper could be swung outwardly from the windshield glass to permit the washing of the glass surface. These arm embodiments, however, have been crude as well as costly in construction.

The present invention has for its object to provide a wiper arm which will provide sufficient pressure in the wiping contact of the blade on the windshield glass and may readily be swung away from the glass, when desired. The invention also has for its object to provide an arm construction of a simple and practical design, enabling the same to be readily stamped and economically formed from sheet metal, and further, to provide a wiper arm which is readily adjustable as to length so as to dispose the wiper for cleaning the more desired area of the windshield.

In the drawing

Fig. 1 is a side elevation of a wiper arm constructed in accordance with the present invention and shown fixed on its actuating shaft and operatively related to a wiper blade;

Fig. 2 is a fragmentary front elevation of the arm;

Fig. 3 is a detailed view of a shaft attaching part thereof;

Fig. 4 is a transverse sectional view about on line 4—4 of Fig. 2;

Fig. 5 is an enlarged fragmentary sectional view about on line 5—5 of Fig. 2 depicting the swinging adjustment of the arm;

Fig. 6 is a view similar to Fig. 5 but showing a modified construction of the arm; and Fig. 7 is a detail of a clamping part employed in the modified construction.

Referring more particularly to the drawing, the numeral 1 designates the actuating shaft and 2 the wiper or blade which is actuated from the shaft by the wiper carrying arm which latter, according to the form depicted in Figs. 1 through 5, comprises a sheet metal inner section 3 fixedly attached to the actuating shaft and an outer section pivotally connected to the inner section 3 by a transverse pin 4. The inner section 3 is stamped from sheet metal and is provided with a skirt or flange 5 which encloses the adjacent portion of the actuating shaft. The shaft connection with the arm may be of any approved form, that depicted herein embodying a serrated shoulder 6 on the shaft adjacent its outer screw threaded end 7 and a reinforcing cupped ring 8 of heavy metal is passed over the threaded end of the shaft and interlocked with the serrations of shoulder 6. The upper edge of the cupped or dished portion of the ring or washer 8 is also serrated and interlockingly engages an internal boss 9 which is formed by depressing the outer wall of the arm section 3. A capped nut 10 is engaged with the threaded portion 7 to clamp the internal boss 9 against the reinforcing ring 8 and thereby firmly and interlockingly secures the inner arm section to the shaft. The outer wall 11 of the sheet metal inner section 3 extends lengthwise of the arm and terminates in an arcuate section 12 which is substantially concentric to the pivot pin 4.

The outer arm section comprises a channeled sheet metal part 13 having ears 14 for pivoting on the pin 4, and a wiper carrying extension part 15 which, in the form illustrated, consists of a spring strip shaped at its outer end to interlock with the blade attaching clip 16 so that the blade may be readily attached and detached therefrom. The inner end portion of part 15 extends within the channel of part 13 and forms a spring leaf 18 for normally bearing on a shoulder or support 17, conveniently provided by the free transverse edge of the arcuate wall 12. The shoulder 17 is so positioned as to normally support the spring leaf 18 under flexure and thereby press the outer end of the arm under an urge sufficient to obtain the desired pressure in the wiping contact of the blade 2 on the windshield glass. The parts 13 and 15 which comprise the outer arm section may be permanently secured together in any suitable manner, such as by overlapping the side walls of the channeled part 13, as indicated at 19 in Fig. 4, and frictionally or otherwise interlocking the two sections as by pressing a nib 20 from one part into a recess 21 in the companion part.

With the arm in its normal position, as shown in Fig. 1, the spring leaf 18 resiliently bears on the shoulder 17 and places the wiper 2 under a resilient pressure against the windshield glass.

To lift the wiper from contact with the glass, it is only necessary to swing the outer arm section 13, 15, outwardly about the pin 4. The shoulder 17 remaining stationary the spring leaf 18 will increase its tension to resist such outward swing.

If desired, the spring leaf may be shortened so that upon continued outward movement of the outer arm section the free end of the spring leaf will ride off the shoulder and over on to the outer arcuate face of the wall 12 where it serves to retain the outer section elevated and the wiper out of contact with the glass. Such position of the arm is indicated by the broken lines in Fig. 5 in which position it will be noted that the spring leaf has been placed under an increased flexure so as to bear more heavily against the arcuate wall 12 and thereby provide sufficient friction to secure the outer arm section in its lifted position. It will be noted that such lifted position is variable and that the outer arm section may be disposed at different angular positions by reason of the fact that the spring leaf 18 will frictionally bear on any selected portion of the arcuate wall 12. There is, therefore, given a wide range of adjustability to which the outer arm section may be lifted for more or less accessibility to the windshield glass. The outward movement of the outer arm section 13 is restricted by the engagement of the shoulder 13', as formed by the adjacent edge of the bottom wall of the sheet metal part 13, with the wall 11, as shown by the broken lines in Fig. 5, while pivotal movement in the opposite direction is limited by the engagement of the free inner end of the spring 18 with the pivot 4.

The spring extension part may be made adjustable in the channeled part to vary the overall length of the wiper arm and thereby permit the user to place the wiper blade to traverse a selected area of the windshield glass. Such an adjustable construction is shown in Fig. 6 wherein the blade carrying part 15' is slidably adjustable in the channeled part 13'. This telescopic adjustment may be secured in a suitable manner, as by a clamping jaw 22, which is trunnioned at 23 in the opposing side walls of the channeled part and is set with sufficient clamping pressure against the extension part by a clamping screw 24. It is noted that this screw bears on the spring 18' and consequently by tightening the screw the flexure of the spring may be increased. By adjusting this screw the tension of the spring may be varied to regulate the wiping pressure of the blade 2, and obviously such screw adjustment will vary the frictional hold on the extensible arm part 15'.

The spring leaf 18' in this modified embodiment of the invention is formed separate from the extension part 15' so as to permit of the adjustment of the latter. These parts are, however, frictionally connected by the clamping jaw 22, and to this end the spring leaf 18' is positioned to overlie the part 15', as shown at 25, so as to provide a rather extensive facial contact. The spring leaf is secured against longitudinal displacement from the channeled part 13', as by interlocking it with a tongue 26 on the clamping jaw 22, the tongue fitting into an opening 27 in the spring leaf. The set screw 24 bears directly on the spring leaf to frictionally bind it to the part 15', and this coupled with the clamping pressure exerted by the jaw 22 will firmly secure the arm parts together. The spring part 15' is held against complete withdrawal from the channeled part by a shoulder 28. In this form of the invention the spring leaf 18' will serve the same purpose as it does in the preferred embodiment, the advantage gained in the modified construction being in the longitudinal adjustment of the arm.

While the foregoing description has been given in much detail it is obvious that the inventive concept herein expressed is capable of embodiment in other physical forms and, therefore, it is not thereby intended to limit the scope of the invention apart from the appended claims.

What is claimed is:

1. A wiper arm for windshield cleaners, comprising an inner section adapted to be fixed to an actuating shaft and having a pivot and an adjacent support, and an outer section comprising a channeled member engaging the pivot and a wiper carrying part of spring material secured in the channel member and extended therein and bearing resiliently on said support adjacent its inner end.

2. A wiper arm for windshield cleaners, comprising an inner section adapted to be fixed to an actuating shaft, and an outer section pivotally mounted on the inner section to swing outwardly from the associated windshield glass and having a spring leaf to urge the outer end of the arm toward the glass, said inner section having a front wall portion extending arcuately about and spaced from the pivot with the free end of the wall constituting a support for the spring leaf to engage, said spring leaf being movable from off the support and over onto the arcuate front wall portion during outward swinging of the outer section to frictionally support the outer section of the arm away from the glass.

3. A wiper arm comprising an inner section, and an outer section pivoted thereto, one section having a support and the companion section having a spring leaf bearing on the support to hold the sections operatively related, said companion section having opposed side walls, and a pressure device journaled in the side walls and adjustably bearing on the leaf spring for adjusting the flexure of the spring to vary the spring pressure in the wiping contact of a supported wiper.

4. A wiper arm, comprising inner and outer sections formed with opposed hinge parts pivotally connected together by a pivot pin, and a leaf spring anchored on one section and having a free end portion movably bearing on a support on the companion section adjacent the pivot pin, said free end portion of the spring being arranged to abut the pivot pin for restricting relative movement between the sections about the pivot pin in one direction.

5. A wiper arm having inner and outer sections pivotally connected together, one of said sections having a channel and the companion section having a supporting part extending beyond the pivot and disposed within the channel, a leaf spring having one end ridingly supported on the supporting part, and means interlocking with the opposite end portion of the spring to anchor the latter in position, said securing means comprising a clamping jaw engaging the spring and pivotally mounted in the channel walls, with a pressure device carried by the jaw and acting upon the spring to secure the jaw operative.

6. A wiper arm having inner and outer sections pivotally connected together, one of said sections having a channel and the companion section having a supporting part extending beyond the pivot and disposed within the channel, the channel walls forming ears on the opposite sides of the companion section and pivotally connected thereto, and a leaf spring anchored at one end in the channel and having its opposite end ridingly supported on the supporting part within the channel, the side walls of the channel extending on opposite sides of the spring and supporting part normally to enclose the same.

7. A wiper arm comprising inner and outer sections formed with opposed hinge parts pivotally connected together by a pivot pin, and a leaf spring anchored on one section and having a free end portion movably bearing on a support on the companion section adjacent the near side of the pivot pin, said free end portion of the spring terminating short of the pivot pin and guided by the support during relative folding movement of the sections to abut the pivot pin for restricting such movement.

8. A wiper arm comprising inner and outer sections formed with opposed hinge parts pivotally connected together by a pivot pin, and a leaf spring anchored on one section and having a free end portion movably bearing on a support on the companion section adjacent the pivot pin, said free end portion of the spring terminating short of the pivot pin and guided by the support to abut the pivot pin for restricting relative movement between the sections about the pivot pin in one direction, said sections being formed with opposing shoulders engageable for restricting relative movement between the sections about the pivot in the opposite direction whereby the pivotal movement between the arm sections will be limited.

ERWIN C. HORTON.